Patented Feb. 14, 1950

2,497,739

UNITED STATES PATENT OFFICE 2,497,739

PROCESS OF SEPARATING ISOMERS OF AMIDONE INTERMEDIATES

Karl Pfister, III, Westfield, N. J., assignor to Merck & Co., Inc., Rahway, N. J., a corporation of New Jersey No Drawing. Application January 5, 1949, Serial No. 69,413

14 Claims. (Cl. 260—465)

This invention relates to a method for the separation of isomeric nitriles and, more particularly, to a method for the separation of a mixture containing the two isomeric aminonitriles obtained in the preparation of Amidone and to novel chemical compounds obtained by this process.

The synthesis of the analgesic drug, Amidone, as described in the Department of Commerce (Office of Publication Board) Report OPB 981, dated July, 1945, involving the reaction between diphenylacetonitrile and 1-dimethylamino-2-chloropropane, results in a mixture containing practically equal amounts of two isomeric aminonitriles, namely, 2,2-diphenyl-4-dimethylaminovaleronitrile and 2,2-diphenyl-3-methyl-4-dimethylaminobutyronitrile. This reaction may be chemically represented by the following equation:

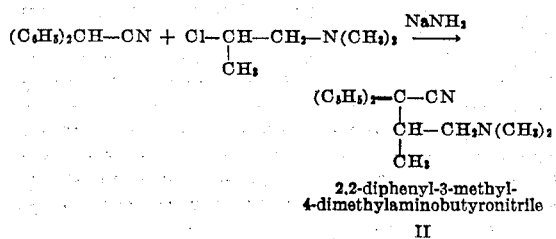

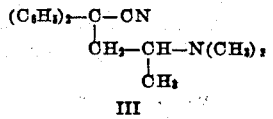

2,2-diphenyl-4-dimethylaminovaleronitrile

The importance of Compounds II and III is readily apparent on noting that the high melting nitrile, 2,2-diphenyl-4-dimethylaminovaleronitrile (M. P. 90–91°) will yield the potent analgesic Amidone, (2-dimethylamino-4,4-diphenylheptanone-5) on reaction with ethylmagnesium bromide while the low melting nitrile 2,2-diphenyl - 3 - methyl-4-dimethylaminobutyronitrile (M. P. 66–67°) is an intermediate in the synthesis of Isoamidone, [1-dimethylamino-2-methyl-3,3-diphenyl-hexanone-4 and salts thereof], useful as an analgesic and anaesthetic, a suitable substitute for morphine for surgical and medical purposes. Thus, by securing an effective and complete separation of the compounds obtained by the German Amidone process into the 2 components in high yield and in good purity, it is likewise possible to synthesize the valuable, therapeutic substances, Amidone and Isoamidone, more conveniently, in better yield and in higher purity than has heretofore been possible.

Ordinarily, the separation of the mixture of the two isomeric products was accomplished by the addition of hexane, the hexane insoluble 2,2-diphenyl-4-dimethylaminovaleronitrile being recovered without great difficulty. However, extraction of the soluble 2,2-diphenyl-3-methyl-4-dimethylaminobutyronitrile was a lengthy and complicated process and the results were unsatisfactory as the yields of the butyronitrile isomer were extremely poor.

It has now been discovered that the mixture of the two isomeric aminonitriles can be effectively separated, the individual nitrile isomers being recovered in pure form and in comparatively high yield, by a simple and economical method. Essentially, the mixture consisting of 2,2-diphenyl-3-methyl-4 - dimethylaminobutyronitrile (II) and 2,2-diphenyl-4-dimethylaminovaleronitrile (III), is added to a p-toluenesulfonic acid (I) solution thereby precipitating the acid salt of the butyro isomer (IV). The latter is separated, recrystallized, neutralized, extracted, concentrated and crystallized to give 2,2-diphenyl-3 - methyl-4-dimethylaminobutyronitrile (II) of excellent purity. Residual liquors containing the acid salt of the valero isomer are neutralized thereby precipitating 2,2-diphenyl-4-dimethylaminovaleronitrile and it is then separated from the solution in substantially pure form.

The reaction may be chemically represented by the following equations:

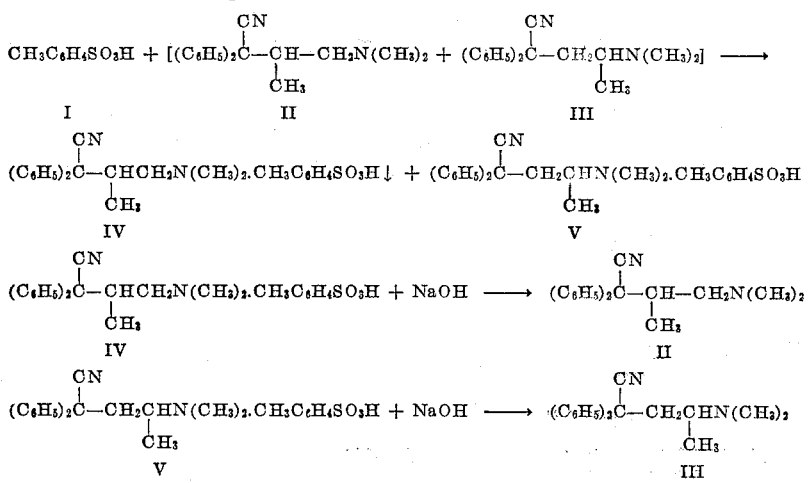

The aqueous p-toluenesulfonic acid solution is conveniently prepared by refluxing 47.6 g. of p-toluenesulfonyl chloride with 50 cc. of water until a clear solution is obtained and then diluting the solution to a volume of 100 cc. This solution is 2.5 N in p-tolenesulfonic acid and about 2–2.5 N in hydrochloric acid.

This method of preparing p-toluenesulfonic acid solution from p-toluenesulfonyl chloride is preferred as it is more economical than starting with the acid itself. The presence of hydrochloric acid is neither beneficial nor detrimental, and allowing it to remain in solution is more economical than removing it.

The following examples illustrate in greater detail the methods for carrying out the present invention, but it is to be understood that these examples are given by way of illustration and not of limitation.

Example I

To 25 cc. of the 2.5 N p-toluenesulfonic acid at 20° C. was added 17.3 g. of a mixture of 56% 2,2-diphenyl-4-dimethylaminovaleronitrile and 44% 2,2-diphenyl-3-methyl-4-dimethylaminobutyronitrile (percentages determined by infrared assay) in 15 cc. of methanol. While stirring, the mixture cooled to room temperature in 0.5 hour and was then allowed to stand for about 3 hours.

The mixture was filtered to remove the precipitate of the butyronitrile p-toluenesulfonic acid salt that formed, and the salt was washed with a mixture of 15 cc. of methanol and 25 cc. of water. After drying at 50° C., the weight was 13.5 g. (48.2% of theory for both isomers), M. P. 215–219° C.

The crude salt was refluxed with 27 cc. of methanol for 0.5 hour, cooled to 0–5° C. and held in that temperature range for 2–3 hours. The mixture was filtered and the cake was washed with 5 cc. of cold methanol (0–5° C.) and dried at 50° C. There was obtained 10.8 g. (39.6% of theory for both isomers) of the p-toluenesulfonic acid salt of 2,2-diphenyl-3-methyl-4-dimethylaminobutyronitrile, M. P. 225–227° C. (pure = 226–227° C.).

The amounts of water and methanol in the initial mixture of p-toluenesulfonic acid and the nitriles can be varied without materially affecting the separation. This is explained by the fact that due to the low solubility of the acid salt of the butyronitrile in both liquids, variations in the amount of these liquids have little effect on the removal of this salt. However, if the quantities are decreased too much, this will result in the precipitation of some of the valeronitrile salt.

Solvents other than water-methanol can be used in this separation process, for example, mixtures of water and other members of the lower aliphatic alcohols, water-acetone mixtures, solvent-free water, etc. Although solvent-free water can be used, it is a bit more difficult to control as valeronitrile will frequently precipitate, undoubtedly due to the accidental introduction of seed.

The refluxing of the butyronitrile salt with methanol serves to remove any valeronitrile salt remaining, and this step can be eliminated if the material, as such, is satisfactory.

Example II

Into a separatory funnel containing a mixture of 16 cc. of water and 16 cc. of ether was added 10.8 g. of the pure p-toluenesulfonic acid salt of 2,2-diphenyl-3-methyl-4-dimethylaminobutyronitrile; while stirring, 10 cc. of 2.5 N sodium hydroxide was added. Two clear layers formed and were then separated. The aqueous layer was extracted 3 times with 5 cc. of ether. The aqueous layer was then discarded and the combined ether extracts were washed twice with 3 cc. of water. The ether extracts were dried over magnesium sulfate, filtered and the sulfate was washed with ether. The filtrate was then concentrated to dryness and the oil remaining was cooled to room temperature, seeded and allowed to crystallize. The solid was broken up and air dried. There was obtained 6.2 g. (35.8% of theory for both isomers) of 2,2-diphenyl-3-methyl-4-dimethylaminobutyronitrile, M. P. 66–67.5° C., 100% pure by infra-red assay.

Solvents other than ethyl ether can be used in this extraction process, for example, chloroform, benzene, toluene and any other organic solvent immiscible with water that will extract the butyronitrile.

Example III

The liquors obtained from the separation of the isomers and from the purification of the crude butyronitrile salt were combined and, while stirring, 34 cc. of 2.5 N sodium hydroxide was added thereto. This addition was purposely slow to permit the valeronitrile to crystallize (if desired, some p-toluenesulfonic acid salt of 2,2-diphenyl-4-dimethylaminovaleronitrile may be obtained from the acidic liquors by concentration to remove the alcohol and some of the water, followed by cooling. 2,2-diphenyl-4-dimethylaminovaleronitrile p-toluenesulfonate crystallizes and may be recrystallized from water, M. P. 167.5–168.5° C.). The mixture was then stirred for about an hour and then filtered. The cake was washed free of hydroxyl ion with water and then dried at 50° C. There was obtained 10.05 g. (58.1% theory for both isomers) of 2,2-diphenyl-4-dimethylaminovaleronitrile, M. P. 88–89.5° C., containing a maximum of 3% butyronitrile by infra-red assay.

If desired, this material can be further purified by dissolving in hot isopropanol, treating with activated charcoal and crystallizing from solution. The pure valeronitrile melts at 90–91° C.

Other strong inorganic bases, such as potassium hydroxide and ammonium hydroxide may successfully be used.

Example IV

To 20 cc. of aqueous 2.5 N p-toluenesulfonic acid at 20° C. was added 13.9 g. of a mixture of 56% of the valeronitrile and 44% of the butyronitrile in 13.9 cc. of ethanol. The mixture was cooled to room temperature and was then allowed to stand for about two hours.

The mixture was filtered to remove the precipitate of the butyronitrile p-toluenesulfonic acid salt that formed and the salt was washed with a mixture of 13.9 cc. of ethanol and 20 cc. of water. After drying at 50° C., the weight was 10.2 g. (45.4% of theory for both isomers), M. P. 220–223° C.

Conversion of the salt as outlined in Example II resulted in a recovery of 6.0 g. (43.2% of theory for both isomers) of 2,2-diphenyl-3-methyl-4-dimethylaminobutyronitrile, M. P. 55–64° C., 92% pure by infra-red assay.

Recovery of the valeronitrile as outlined in Example III resulted in a recovery of 7.5 g. (54% of theory for both isomers) of 2,2-diphenyl-4-dimethylaminovaleronitrile, M. P. 88–90° C., containing a maximum of 3% butyronitrile, by infra-red assay.

Example V

To 2.5 cc. of aqueous 2.5 N p-toluenesulfonic acid at 20° C. was added 1.73 g. of a 50:50 mixture of the valeronitrile and the butyronitrile in 1.5 cc. of acetone. The mixture was cooled to room temperature and was then allowed to stand for about two hours.

The mixture was filtered to remove the precipitate of the butyronitrile p-toluenesulfonic acid salt that formed, and the salt was washed with a mixture of 1.5 cc. of acetone and 2.5 cc. of water. After drying at 50° C., the weight of the p-toluenesulfonic acid salt of 2,2-diphenyl-3-methyl-4-dimethylaminobutyronitrile was 1.58 g. (56.4% of theory for both isomers), M. P. 217–221° C.

The butyronitrile and valeronitrile can be recovered by the method outlined in Examples II and III.

Example VI

To 2 cc. of aqueous 2.5 N p-toluenesulfonic acid at 20° C. was added 1.4 g. of a mixture of 20% of the valeronitrile and 80% of the butyronitrile, in solid form. A white precipitate instantly formed. The slurry was heated to 100° C. for several minutes and was then cooled to room temperature.

The mixture was filtered to remove the precipitate of the butyronitrile p-toluenesulfonic acid salt that formed and the salt was then washed with 3 cc. of water. After drying at 50° C., the weight of the p-toluenesulfonic acid salt of 2,2-diphenyl-3-methyl-4-dimethylaminobutyronitrile was 1.77 g. (78.2% of theory for both isomers), M. P. 215.5°–216.5° C.

The butyronitrile and valeronitrile can be recovered by the method outlined in Examples II and III.

Various changes and modifications may be made in carrying out the present invention without departing from the spirit and scope thereof. Insofar as these changes and modifications are within the scope of the appended claims, they are to be considered as part of this invention.

I claim:

1. A process for the separation of a mixture consisting of 2,2-diphenyl-4-dimethylaminovaleronitrile and 2,2-diphenyl-3-methyl-4-dimethylaminobutyronitrile which comprises precipitating said 2,2-diphenyl-3-methyl-4-dimethylaminobutyronitrile from said mixture by the addition of p-toluenesulfonic acid.

2. A process for the separation of a mixture consisting of 2,2-diphenyl-4-dimethylaminovaleronitrile and 2,2-diphenyl-3-methyl-4-dimethylaminobutyronitrile which comprises precipitating said 2,2-diphenyl-3-methyl-4-dimethylaminobutyronitrile from said mixture by the addition of an aqueous solution of p-toluenesulfonic acid.

3. A process for the separation of a mixture consisting of 2,2-diphenyl-4-dimethylaminovaleronitrile and 2,2-diphenyl-3-methyl-4-dimethylaminobutyronitrile which comprises precipitating said 2,2-diphenyl-3-methyl-4-dimethylaminobutyronitrile from said mixture by the addition of p-toluenesulfonic acid in a solvent consisting of water and a water miscible organic solvent, said solvent being capable of dissolving the p-toluenesulfonic acid salt of said 2,2-diphenyl-4-dimethylaminovaleronitrile.

4. A process for the separation of a mixture consisting of 2,2-diphenyl-4-dimethylaminovaleronitrile and 2,2-diphenyl-3-methyl-4-dimethylaminobutyronitrile which comprises precipitating said 2,2-diphenyl-3-methyl-4-dimethylaminobutyronitrile from said mixture by the addition of p-toluenesulfonic acid in a solvent consisting of water and a lower aliphatic alcohol.

5. A process for the separation of a mixture consisting of 2,2-diphenyl-4-dimethylaminovaleronitrile and 2,2-diphenyl-3-methyl-4-dimethylaminobutyronitrile which comprises precipitating said 2,2-diphenyl-3-methyl-4-dimethylaminobutyronitrile from said mixture by the addition of p-toluenesulfonic acid in a solvent consisting of water and methanol.

6. A process for the separation of a mixture consisting of 2,2-diphenyl-4-dimethylaminovaleronitrile and 2,2-diphenyl-3-methyl-4-dimethylaminobutyronitrile which comprises precipitating said 2,2-diphenyl-3-methyl-4-dimethylaminobutyronitrile from said mixture by the addition of p-toluenesulfonic acid in a solvent consisting of water and ethanol.

7. A process for the separation of a mixture consisting of 2,2-diphenyl-4-dimethylaminovaleronitrile and 2,2-diphenyl-3-methyl-4-dimethylaminobutyronitrile which comprises precipitating said 2,2-diphenyl-3-methyl-4-dimethylaminobutyronitrile from said mixture by the addition of p-toluenesulfonic acid in a solvent consisting of water and acetone.

8. A process for separating into its constituent isomers a mixture consisting of 2,2-diphenyl-4-dimethylaminovaleronitrile and 2,2-diphenyl-3- methyl - 4 - dimethylaminobutyronitrile which comprises reacting said mixture with p-toluenesulfonic acid, removing the precipitated 2,2-diphenyl-3-methyl-4 - dimethylaminobutyronitrile in the form of its p-toluenesulfonic acid salt, extracting and recovering therefrom by conventional methods said 2,2-diphenyl-3-methyl-4-dimethylaminobutyronitrile in substantially pure form; extracting and recovering from the residual liquor by conventional methods, substantially pure 2,2-diphenyl-4-dimethylaminovaleronitrile from its corresponding p-toluenesulfonic acid salt.

9. A process for separating into its constituent isomers a mixture consisting of 2,2-diphenyl-4-dimethylaminovaleronitrile and 2,2-diphenyl-3-methyl - 4 - dimethylaminobutyronitrile which comprises reacting said mixture with an aqueous solution of p-toluenesulfonic acid, removing the precipitated 2,2-diphenyl-3-methyl-4-dimethylaminobutyronitrile in the form of its p-toluenesulfonic acid salt, extracting and recovering therefrom by conventional methods said 2,2-diphenyl-3-methyl-4 - dimethylaminobutyronitrile in substantially pure form; extracting and recovering from the residual liquor by conventional methods substantially pure 2,2-diphenyl-4-dimethylaminovaleronitrile from its corresponding p-toluenesulfonic acid salt.

10. A process for separating into its constituent isomers a mixture consisting of 2,2-diphenyl-4-dimethylaminovaleronitrile and 2,2-diphenyl-3-methyl - 4 - dimethylaminobutyronitrile which comprises reacting said mixture with p-toluenesulfonic acid in a solvent consisting of water and a water-miscible organic solvent, said solvent being capable of dissolving the p-toluenesulfonic acid salt of said 2,2-diphenyl-4-dimethylaminovaleronitrile, removing the precipitated 2,2-diphenyl-3-methyl-4 - dimethylaminobutyronitrile in the form of its p-toluenesulfonic acid salt, extracting and recovering therefrom by conventional methods said 2,2-diphenyl-3-methyl-4-dimethylaminobutyronitrile in substantially pure form; extracting and recovering from the residual liquor by conventional methods substantially pure 2,2-diphenyl-4-dimethylaminovaleronitrile from its corresponding p-toluenesulfonic acid salt.

11. A process for separating into its constituent isomers a mixture consisting of 2,2-diphenyl-4-dimethylaminovaleronitrile and 2,2-diphenyl-3-methyl - 4 - dimethylaminobutyronitrile which comprises reacting said mixture with p-toluenesulfonic acid in a solvent consisting of water and a lower aliphatic alcohol, removing the precipitated 2,2-diphenyl-3-methyl-4-dimethylaminobutyronitrile in the form of its p-toluenesulfonic acid salt, extracting and recovering therefrom by conventional methods said 2,2-diphenyl-3-methyl-4 - dimethylaminobutyronitrile in substantially pure form; extracting and recovering from the residual liquor by conventional methods substantially pure 2,2 - diphenyl - 4 - dimethylaminovaleronitrile from its corresponding p-toluenesulfonic acid salt.

12. A process for separating into its constituent isomers a mixture consisting of 2,2-diphenyl-4-dimethylaminovaleronitrile and 2,2-diphenyl-3-methyl - 4 - dimethylaminobutyronitrile which comprises reacting said mixture with p-toluenesulfonic acid in a solvent consisting of water and methanol, removing the precipitated 2,2-diphenyl-3-methyl-4 - dimethylaminobutyronitrile in the form of its p-toluenesulfonic acid salt, extracting and recovering therefrom by conventional methods said 2,2-diphenyl-3-methyl-4-dimethylaminobutyronitrile in substantially pure form; extracting and recovering from the residual liquor by conventional methods substantially pure 2,2-diphenyl-4-dimethylaminovaleronitrile from its corresponding p-toluenesulfonic acid salt.

13. A process for separating into its constituent isomers a mixture consisting of 2,2-diphenyl-4-dimethylaminovaleronitrile and 2,2-diphenyl-3-methyl - 4 - dimethylaminobutyronitrile which comprises reacting said mixture with p-toluenesulfonic acid in a solvent consisting of water and ethanol, removing the precipitated 2,2-diphenyl-3-methyl-4 - dimethylaminobutyronitrile in the form of its p-toluenesulfonic acid salt, extracting and recovering therefrom by conventional methods said 2,2-diphenyl-3-methyl-4-dimethylaminobutyronitrile in substantially pure form; extracting and recovering from the residual liquor by conventional methods substantially pure 2,2-diphenyl-4-dimethylaminovaleronitrile from its corresponding p-toluenesulfonic acid salt.

14. A process for separating into its constituent isomers a mixture consisting of 2,2-diphenyl-4-dimethylaminovaleronitrile and 2,2-diphenyl-3-methyl - 4 - dimethylaminobutyronitrile which comprises reacting said mixture with p-toluenesulfonic acid in a solvent consisting of water and acetone, removing the precipitated 2,2-diphenyl-3-methyl-4 - dimethylaminobutyronitrile in the form of its p-toluenesulfonic acid salt, extracting and recovering therefrom by conventional methods said 2,2-diphenyl-3-methyl-4-dimethylaminobutyronitrile in substantially pure form; extracting and recovering from the residual liquor by conventional methods substantially pure 2,2-diphenyl-4-dimethylaminovaleronitrile from its corresponding p-toluenesulfonic acid salt.

KARL PFISTER, III.

REFERENCES CITED

The following references are of record in the file of this patent:

UNITED STATES PATENTS

| Number | Name | Date |
| --- | --- | --- |
| 2,230,774 | Bockmuhl et al. | Feb. 4, 1941 |

OTHER REFERENCES

Noller et al., J. Am. Chem. Soc., vol. 54, pp. 670–673 (1932).